United States Patent [19]
Somogyi

[11] 3,878,096
[45] Apr. 15, 1975

[54] CONTINUOUS FILTRATION PLANT

[76] Inventor: Francis Paul Somogyi, 17 Waterloo Pl., London, England

[22] Filed: June 27, 1973

[21] Appl. No.: 375,983

Related U.S. Application Data

[63] Continuation of Ser. No. 110,008, Jan. 27, 1971, abandoned.

[30] Foreign Application Priority Data

Feb. 2, 1970 United Kingdom................. 4940/70
Apr. 21, 1970 United Kingdom............... 19074/70

[52] U.S. Cl. ................ 210/110; 210/112; 210/189; 210/268
[51] Int. Cl. ........................................... B01d 23/26
[58] Field of Search ......... 210/33, 34, 97, 103, 110, 210/189, 268, 195

[56] References Cited
UNITED STATES PATENTS

| | | | |
|---|---|---|---|
| 2,057,887 | 10/1936 | Elliott et al. ...................... | 210/268 X |
| 2,073,388 | 3/1937 | Elliott et al. ........................ | 210/268 |
| 2,771,407 | 11/1956 | Penick ............................ | 210/110 X |
| 2,776,258 | 1/1957 | Gilliland ........................... | 210/34 X |
| 3,617,539 | 11/1971 | Grutsch et al. ...................... | 210/195 |

OTHER PUBLICATIONS

Chemical Engineering, 6/12/1961, pps. 217–222, Fluid Flow Control Devices.

*Primary Examiner*—Samih N. Zaharna
*Assistant Examiner*—Robert H. Spitzer
*Attorney, Agent, or Firm*—Walter G. Finch

[57] ABSTRACT

The present invention relates to a method and a continuous filtration apparatus, for instance, for water, which is characterised by using a porous bed of discrete material, sand, coke, breeze or other reactive agent, moving in one direction, whilst water or other liquid moves in the opposite direction. What is thereby achieved is that the dirtiest part of the filter or reactor media is in continuous contact with the dirtiest part of the liquid or gas to be filtered, and at the point of the liquid or gas emerging from the solid bed, the solid bed is at its cleanest. A small but varying proportion of the filter bed is continuously or intermittently extracted at such a rate as is necessary to remove the deposited dirt and/or to avoid the blockage of the filter by the removed impurities. Such filtering media removed is then cleaned, suitably purified and, if necessary, chemically treated, before being returned to the filter bed with the new material. The filter bed itself is automatically filled at the same rate as discharged, on the lower end, and can consist of one or various mixtures of filtering media, if necessary with chemicals, flocculents and so on added to suit the purpose of the filtration and the nature of the impurities and of the liquid from which they have to be removed. such apparatus removes the necessity of backwashing the media inside the apparatus and obviates the costly backwash cycle controls. It also can operate on much thicker liquids — up to several per cent suspended solids.

6 Claims, 6 Drawing Figures

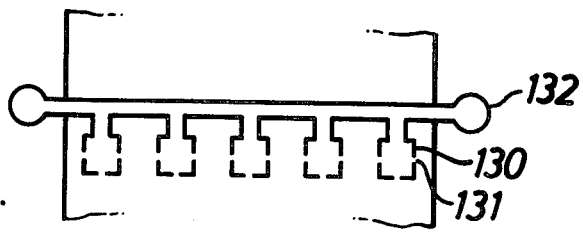
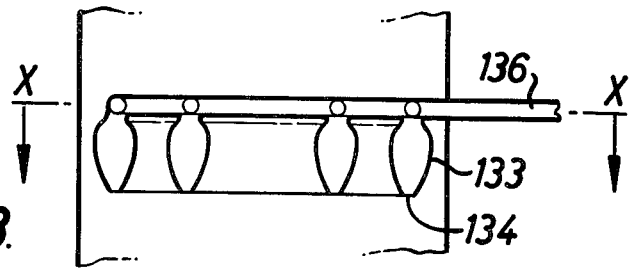
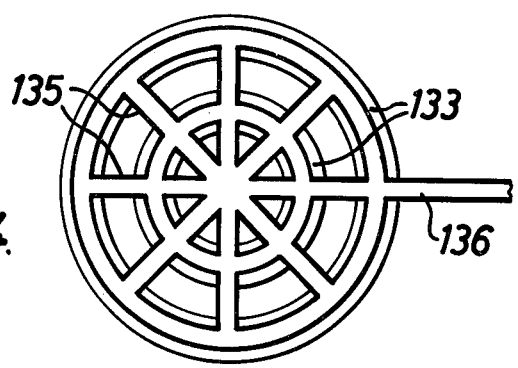
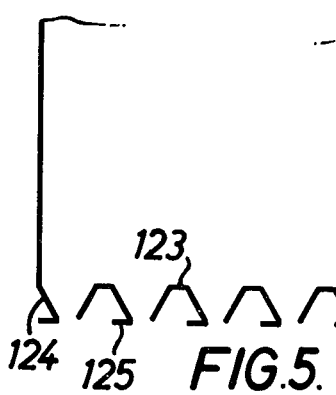
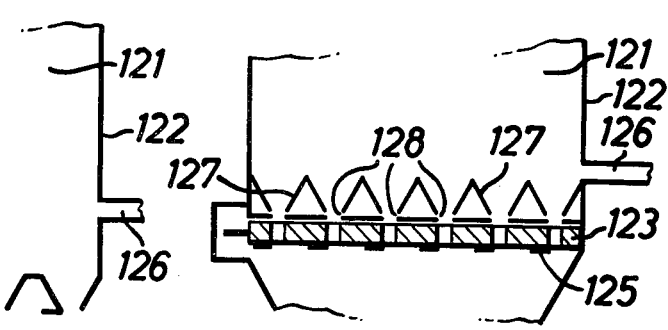

CONTINUOUS FILTRATION PLANT

This is a continuation of application Ser. No. 110,008, filed Jan. 27, 1971, now abandoned.

The present invention relates to a method and apparatus for the continuous filtration of liquids through a bed of discrete material as a filtering medium and at the same time continuous replacement of the discrete material, discharged during the operation of the filter.

Accordingly the present invention provides an apparatus for the continuous filtration of a liquid which apparatus comprises: a vessel which is capable of containing a porous bed of discrete material, that is to say a bed made up of a plurality of discrete particles, which moves in counter-current to the liquid to be filtered, the height of the porous bed to the diameter of the vessel having a ratio of not greater than 5:1; an inlet pipe connected to the vessel and through which the liquid to be filtered can flow into the vessel below; one or more outlet pipes connected to the vessel and through which the filtered liquid can flow out of the vessel; an inlet means for receiving the said discrete material, at the top of the vessel; and one or more outlet means for discharging the said discrete material, positioned at the base of the vessel.

The present invention further provides a method of continuously filtering a liquid which comprises passing the liquid continuously through a porous bed of discrete material contained in a vessel, in which the discrete material forming the bed is moved in the opposite direction to that of the liquid, the bed being removed continuously or intermittently from the base of the vessel and replenished continuously or intermittently at the top of the vessel.

The discrete material for example sand or coke breeze of other suitable minerals are preferably fed to the vessel at the top and are removed from the bottom through for example a discharge gate. The residence period of the filtering media may be varied according to the amount of foreign matter to be removed from the liquid. It is varied by altering the rate of discharge of the filtering media from the bottom of the filter bed. The inlet pipe or pipes for the unfiltered liquid is positioned above the discharge gate for the discrete material and one set of the outlet pipe or pipes for the filtered liquid may be above the level of the bed of discrete material. The liquid passes out from the vessel with a minimum amount of discrete particles suspended in it.

Another way of separating the liquid from the discrete particles at the top of the bed is by constructing the inlet means for the filtering media as a funnel the narrower and lower end of the funnel causing the discrete particles to enter below the level of the liquid outlet pipe.

The most preferable type of the outlet means for the removal of the discrete material from the bed is one which lowers the bed evenly across the cross-sectional area of the vessel. One preferred form of the outlet means is one which has openings in a plate, each opening being connected to gate valves and the openings being evenly spaced across the cross-sectional area of the base of the vessel to allow even discharge of the filtering media across the whole cross-sectional area of the vessel. Alternatively the outlet means may comprise a discharge gate with slots distributed evenly over the cross-sectional area.

The method of this invention allows filtration of liquid continuously through the bed of discrete material which is constantly replenished. The replenishment of bed allows the quality of filtration of the liquid over a long period of time to be uniform. When filter media is removed from the bed of filtration apparatus it may be cleaned to remove residue remaining after the liquid has been filtered. It may then be returned to the top of the bed in a recycling process. However the method and some apparatus used in this invention are not only suitable for the filtration of contaminated water, or sewerage but also other liquids containing suspended materials the recovery of which are required. In this latter type of filtration process the bed of discrete material may be formed of particles of the type of material that is to be removed from the liquid. Apart from filtration, this process may also be used for other treatments of liquids. The discrete material may be treated or mixed with chemicals to help to precipitate and/or coagulate impurities in the liquid. At one or more levels through pipes passing through the walls of the vessel chemical solutions or gas can be introduced which will subsequently react with the liquid. Means are provided to enable the chemicals to spread evenly across the cross-section of the vessel. The chemicals include for example oxygen air and other gases as well as the coagulant mentioned above.

For normal filtration purposes the type of discrete material to be used as a filter bed can be for instance sand or anthracite for filtration of water such as sewerage and for many other applications.

The method of this invention may be advantageously altered while maintaining the basic method described above.

Drainage pipes or boxes may be situated in the vessel in the bed of discrete material to remove the liquid being filtered. They are connected to manifolds which pass through the wall of the vessel and through which the liquid may flow.

These pipes or boxes may be perforated and should be situated on various levels below the top level of the discrete material. Most of the liquid may then pass out from the vessel through these means and only the remaining liquid passing up through the remaining bed and out of the outlet pipe. The purpose of this embodiment is to prevent fluidisation of the bed. The weight of the bed pressing down on the particles at the level of the drainage means prevents fluidisation of the bed and therefore allows a larger throughput of the liquid below the drainage levels. The rate of flow of liquid through the bed of this invention is limited by fluidisation of the bed.

One method of preventing the bed from fluidising has already been discussed, i.e., the drainage means which may be perforated pipes or boxes removing water from the bed after filtration but intermediate the inlet and outlet pipes. Another method is to create backpressure at the outlet. The combined effect of the backpressure from the outlet pipe and the weight of the filtering media above any drainage system prevents the bed from fluidising when the flow rate through the inlet pipe is increased.

The apparatus and method of performing the invention will be further specifically described with particular reference to the drawings.

FIG. 2 represents a longitudinal cross-section of a drainage means with outside manifold;

FIG. 3 represents a longitudinal cross-section of an inverted circular channelled drainage means;

FIG. 4 represents a horizontal cross-section at the point X—X in FIG. 3;

FIG. 5 represents a vertical cross-section of an outlet means to remove the filtering media from the vessel;

FIG. 6 represents a vertical cross-section of an outlet means to remove the filtering media from the vessel.

Figure 1:
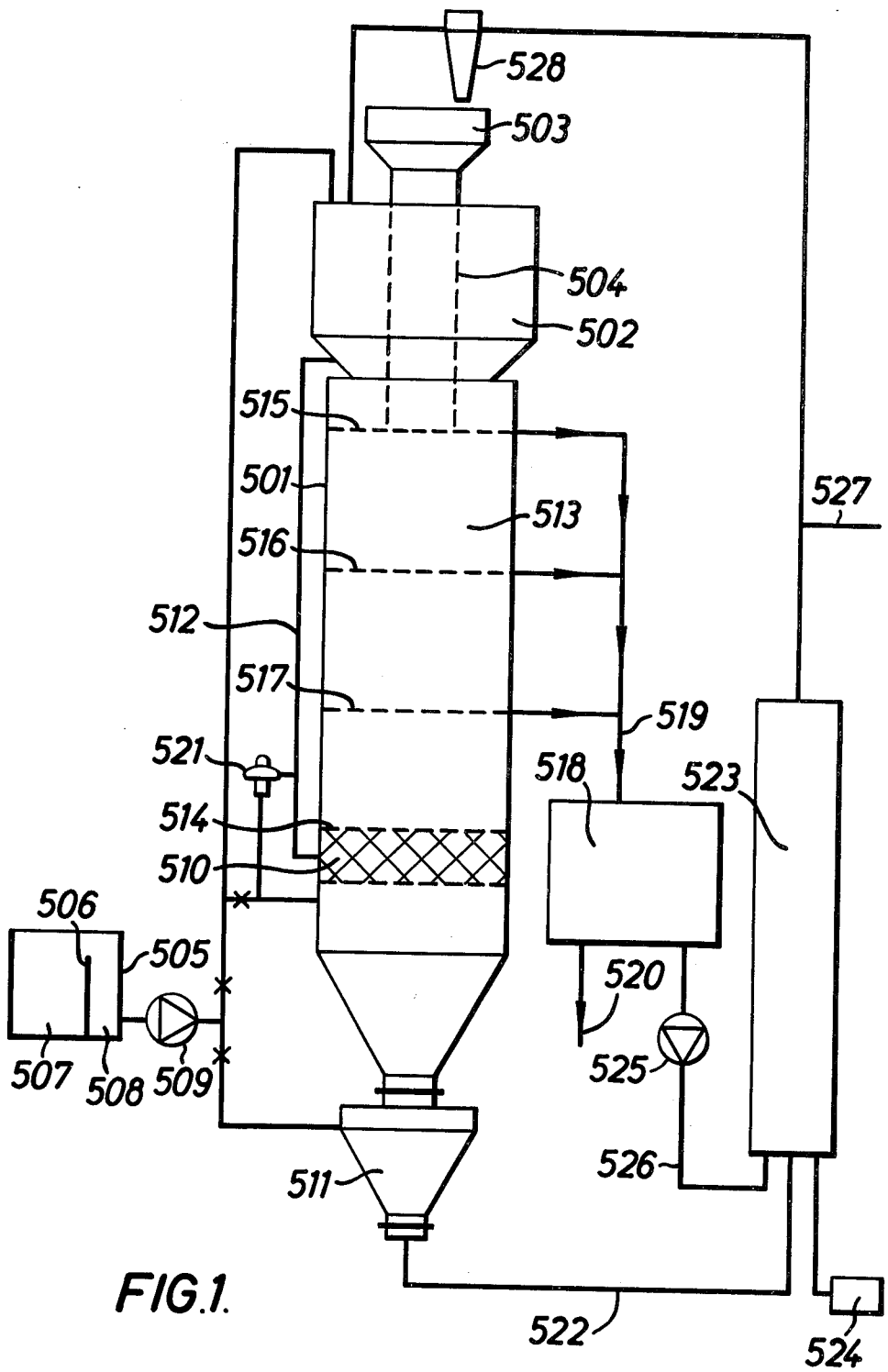
FIG. 1 represents a flow diagram of the filtration apparatus.

FIG. 1 shows a flow diagram of the filtration process. A vertical filter column 501 has a raw water tank 502 positioned above the vessel. A filtering media hopper 503 has a pipe 504 which passes from its base through the raw water tank 502 into the vessel 501. Water to be filtered is supplied to the lagoon 505. The lagoon 505 has a baffle board 506 so that it is divided into two sections 507, 508. The water is supplied to the section 507, passes over the baffle board 506 and is pumped by a pump 509 to the raw water tank 502. Any large particles contained in the water may thus settle in the lagoon before the water passes to the filter column 501. The raw water is also supplied to an agitator 510 and a discharge gate 511. The water from the raw water tank 502 passes down a raw water feed pipe 512 to the lower part of the vessel 501.

Filtering media enters the vessel through hopper 503 and down the pipe 504 to form a bed of filtering media 513 in the vessel between the lowest distribution and draining means 514 and the highest distribution and draining means 515. Between these drainage means 514, 515 there may be one or more other drainage means 516, 517 (two drainage means are shown in FIG. 1). The filtering media passes from the bed 513 through the agitator 510 out through the discharge gate 511.

Water to be filtered enters the vessel through the distribution and drainage means 514, passes up through the bed and may be removed from the bed after sufficient filtration through the drainage means 515, 516, 517 and passes to a clean water tank 518 through clean water pipes 519. The distribution and drainage means may take the form of those previously described herein. The clean water is removed from the clean water tank 518 whenever required through pipeline 520.

In a similar manner to the continuous flow of water from the vessel 501 through the drainage means 515, 516, 517 the now dirty or contaminated filtering media is continually removed from the base of the vessel through the discharge gate 511. The filtering media passes through the agitator 510 assisted by some raw water from the pump 509. The rate of flow of the discharge of the filtering media from the agitator is controlled according to the rate of supply of raw water from the tank 502 in the pipeline 512 by means of the flow sensitive device 521. The greater the rate of flow of raw water the greater is the rate of discharge of the filtering media from the filter bed. The filtering media collects at the bottom of vessel 501 and passes into the discharge gate 511. A little more raw water from the pump assists the discharge of the contaminated filtering media through the pipeline 522 to the filtering media washer 523. The filtering media and small amount of raw water is turbulated with clean water by means of compressed air from a compressor 524. The clean water is pumped from the clean water tank 518 by a pump 525 through a pipeline 526. The impurities from the washing pass out of a discharge line 527 and the cleaned sand passes to a dewatering cyclone 528. The water removed from this cyclone passes into the raw water tank 502 while the sand drops from the base of the cyclone into the hopper 503 to renew the filter bed 513.

FIG. 2 shows an arrangement for removing liquid from the bed intermediate the inlet and outlet pipes. The purpose of these arrangements of drainage means is to remove water evenly across the whole cross-sectional area of the vessel. The perforated drainage boxes 130 are shown in vertical cross-section connected by manifold pipes to the outside. The ratio of the diameter of the aperture or perforation 131 to the diameter of the discrete material should not be greater than 100:1. The perforated pipes or boxes may be connected to an outside manifold 132 as shown in this Figure. Additionally the drainage manifolds of these various arrangements may be connected together to form a drainage manifold communal to the drainage boxes on each level of vessel as the drainage means in the vessel may be at several levels in the vessel.

FIGS. 3 and 4 show another preferred type of drainage means which consists of two inverted circular channels 133. The channels 133 may be of a gauge or fine mesh wire fabric. The opening 134 is narrower than the upper part of the channel. At points around the channel manifolds 135 connect to the main drainage manifold 136 which removes the water from the vessel.

There is shown in FIG. 5 an outlet means for the discharge of filtering media. The filtering media 121 is contained in the vessel 122. At the base of the vessel 122 there is a circular plate 123 of the same cross-sectional areas as the vessel 122 with many circular openings arranged over its area. Each of these openings has connected to it a funnel 124. At the base of the funnel is a gate 125 which can be operated in conjunction with each of the other gates at the base of every other funnel. The liquid to be filtered enters the vessel 122 through an inlet pipe 126 and is removed from further up the vessel (not shown). The filtering media is removed evenly across the cross-sectional area of the vessel through the discharge gates 125.

In another form of filtering media discharge means shown in FIG. 6 the circular plate 123 is positioned at the bottom of the vessel 122. The discharge gate 125 allows even passage of the filtering media across the whole cross-section area of the vessel. Above the plate 123 there are saddles 127 at raised areas between the openings of the plate 123. These saddles 127 form funnel-like entrances to each of the holes. The saddles are hollow and thus provide hoppers and at the edge of each of the holes in the circular plate are spray openings 128. Water can be pumped through the saddles 127 to spray the edges of the circular holes to prevent sand from sticking and holding up when passing through the circular plate 123.

This description of course relates to one cyclic process. It may be that different degrees of treatment may be given to the water or any other liquid to be filtered by passing the water in the pipeline to one or more other continuous counter current filtration apparatus.

Another embodiment of the plant is to put the washed sand batch-wise in a small separate column, making it possible to do the sand washing continuously outside the bed over the whole period, without the necessity of the huge backwashing capacity employed on present filters. Such a washing column, which would not exceed two feet of sand bed, and with the same flow rate as the present backwashing, could be employed either before, or preferably after, the above mentioned classifying cyclone. The main economy would then be derived from the extension of the washing time of the whole period of filtration, whilst reducing the quantity of sand to be washed to a fraction, probably less than 10 percent of the amount of sand washed when cleaning stationary beds.

To summarise, therefore, the present invention relates to a method and a continuous filtration apparatus, for instance, for water, which is characterised by using a porous bed of discrete material, sand, coke, breeze or other reactive agent, moving in one direction, whilst water or other liquid moves in the opposite direction. What is thereby achieved is that the dirtiest part of the filter or reactor media is in continuous contact with the dirtiest part of the liquid or gas to be filtered, and at the point of the liquid or gas emerging from the solid bed, the solid bed is at its cleanest. A small but varying proportion of the filter bed is continuously or intermittently extracted at such a rate as is necessary to remove the deposited dirt and/or to avoid the blockage of the filter by the removed impurities. Such filtering media removed is then cleaned, suitably purified and, if necessary, chemically treated, before being returned to the filter bed with the new material. The filter bed itself is automatically filled at the same rate as discharged, on the lower end, and can consist of one or various mixtures of filtering media, if necessary with chemicals, flocculents and so on added to suit the purpose of the filtration and the nature of the impurities and of the liquid from which they have to be removed. Such apparatus removes the necessity of backwashing the media inside the apparatus and obviates the costly backwash cycle controls. It also can operate on much thicker liquids — up to several per cent suspended solids.

I claim:

1. An apparatus for the continuous filtration of a liquid, comprising, a porous bed of discrete material, a vessel which is capable of containing said porous bed of discrete material which is movable in counter-current to the liquid to be filtered, said vessel being structured such that the height of the vessel section which will contain said porous bed of discrete material to the diameter of the vessel has a ratio of not greater than 5:1; inlet pipe means connected to the bottom of said vessel and through which the liquid to be filtered can flow into said vessel; an outlet pipe means connected to said vessel and spaced vertically from said inlet pipe means for permitting the outflow of the filtered liquid; a plurality of drainage devices positioned at spaced vertical intervals intermediate the top and bottom of said vessel and connected to said liquid outlet pipe means to allow uniform drainage of liquid from said porous bed of discrete material; each drainage device extending over substantially the whole cross sectional area which will contain said porous bed of discrete material, with the filtered liquid flowing from said vessel out of said drainage devices; each of the drainage devices comprising inverted circular channels having upper and lower openings therein, channel manifolds internal of the vessel and communicating with said circular channels through said upper openings, and a main drainage manifold external of the vessel and communicating with the channel manifolds, the lower openings in said circular channels communicating with said porous bed of discrete material and receiving the upwardly moving liquid therein and channeling said received liquid through the upper openings and into the channel manifolds for subsequent movement out of the vessel through the main drainage manifold, the inverted circular channels concentrically inscribing and lying over the full cross-sectional area of said porous bed of discrete material thereby to remove liquid uniformly from said porous bed of discrete material in the plane in which the lower openings lie; inlet means for receiving the discrete material for said porous base of discrete material, at the top of the vessel; at least one outlet means for discharging the discrete material from said porous bed of discrete material positioned at the base of said vessel, the outlet means comprising a plate of substantially the same area as the cross-sectional area of the vessel in the plane in which the plate lies, the plate having a plurality of circular openings, a plurality of funnels connected one each to one each of the circular openings, the discrete material from said porous bed of discrete material moving through the funnels for discharge from the vessel; means for controlling within the vessel the rate at which the discrete material from said porous bed of discrete material is discharged from the vessel, said means comprising a gate at the base of each of the funnels for controlling the movement of discrete material from said porous bed of discrete material through the circular openings and the funnels connected thereto; and means for receiving the discharged discrete material from said porous bed of discrete material and at least portions of the filtered liquid for cleaning the discharged discrete material from said porous bed of discrete material.

2. The apparatus of claim 1 wherein the funnels comprising the outlet means for discharging the discrete material from said porous bed of discrete material are comprised of saddles disposed between the openings in the plate and form funnel-like entrances to the holes, the saddles being hollow, and spray openings at the bases of the saddles through which water is directed toward the circular holes to prevent the discrete material from said porous bed of discrete material from clogging the holes.

3. An apparatus as claimed in claim 1, wherein the particle diameter of said discrete material is not greater than 5/32 inches.

4. An apparatus as claimed in claim 3 wherein said vessel is cylindrical with a funnel shape at the lower end thereof, said outlet means being attached to said funnel shape and through which the filtering media can flow, with the inlet means for said discrete material comprising a funnel which enables the discrete material to pass into said vessel, with the upper and broader end of said funnel being positioned outside said vessel and the lower and narrower end of said funnel passing into said vessel such that, the lower end of the funnel is positioned below the filtered liquid outlet means.

5. An apparatus as claimed in claim 1 and additionally means for returning the cleaned discrete material to said vessel.

6. An apparatus as claimed in claim 1 wherein said rate controlling means includes a flow sensitive device which controls the rate of supply of raw water to the lower end of the vessel to assist in the discharge of the discrete material thereform.

* * * * *